United States Patent Office 2,952,524
Patented Sept. 13, 1960

2,952,524
MANUFACTURE OF CARBONYLS OF METALS OF GROUP VI–B OF THE PERIODIC TABLE

Harold E. Podall, Baton Rouge, La., assignor to Ethyl Corporation, New York, N.Y., a corporation of Delaware No Drawing. Filed Aug. 24, 1959, Ser. No. 835,436

3 Claims. (Cl. 23—203)

This invention relates to the manufacture of metal carbonyls and particularly the production of group VI–B metal carbonyls.

The group VI–B metal carbonyls, i.e., chromium hexacarbonyl, molybdenum hexacarbonyl and tungsten hexacarbonyl, have been known for many years. They have had limited industrial use in such applications as metal plating, in which the carbonyl is decomposed on the surface of the material to be plated. However, no extensive commercial use has been made of these compounds due largely to their extremely high cost of manufacture. One prior method of preparation, for example, involves the use of a Grignard as a reducing agent for the metal salts, the reduced metal compound being simultaneously reacted with carbon monoxide to form the metal carbonyl. Other processes utilize certain metal reducing agents, along with the metal iodide and carbon monoxide. However, such processes give only very low yields, if any, of the desired metal carbonyls, especially when using the relatively inexpensive reducing agents, such as sodium metal.

It is accordingly an object of this invention to provide an improved process for the manufacture of carbonyls of metals of group VI–B of the periodic table, i.e., of chromium, molybdenum, and tungsten. It is a further object to provide a novel process capable of giving exceptionally high yields of these metal carbonyls by an economic process. Other objects and advantages of this invention will be apparent by the following description and claims.

It has now been found that exceedingly high conversions, i.e., above 70 percent and frequently above 80 percent, can be attained by reacting group VI–B metal chlorides, i.e., chromium, molybdenum and tungsten chlorides, with carbon monoxide and sodium metal in a highly subdivided form, i.e. an average particle size from about 0.1 micron to about 100 microns, at a temperature below about 0° C. and thereafter hydrolyzing the intermediate product while simultaneously reacting the same with carbon monoxide. Both temperature control and the presence of carbon monoxide in the hydrolysis are very necessary to the attainment of these high conversions. The second carbonylation is also best conducted at low temperatures, e.g., below 25° C. and preferably below about 0° C.

Surprisingly, it has been found that if the hydrolysis is carried out in the absence of carbon monoxide, the conversion of the metal salt to the desired metal carbonyl is only a fraction of that obtained in the presence of the carbon monoxide. Likewise, it is surprisingly found that when the initial reaction is conducted at temperatures above about 0° C., appreciably lower conversions are obtained. This is especially surprising since sodium metal does not react with these metal chlorides at temperatures below 0° C., at least at any significant rate. In the presence of the carbon monoxide, the reaction proceeds smoothly and rapidly even at such low temperatures and the entire reaction is normally completed in from 1–3 hours.

The reaction mechanism of the present process is not completely understood. However, it appears that the metal carbonyl is formed in a two-step process, as follows:

(1) $MCl_x + (x+2)Na + 5CO \rightarrow Na_2M(CO)_5 + xNaCl$ (2) $Na_2M(CO)_5 + 2H_3O^+ \rightarrow M(CO)_5 + 2Na^+ + H_2 + H_2O$ In the above equations, M is chromium, molybdenum or tungsten and $x$ is the valence of the metal M in the compound employed.

More particularly the process of the present invention comprises reacting sodium metal, preferably in the form of a sodium dispersion having an average particle size between about 1 and 10 microns, with a chloride of the desired metal, i.e., chromium, molybdenum and tungsten in an inert solvent media while maintaining a carbon monoxide pressure of from atmospheric to 50,000 p.s.i.g. and preferably from about 100 to 10,000 p.s.i.g. Thereafter, this reaction product is then hydrolyzed by contact with water, preferably dilute aqueous acids, in the presence of a carbon monoxide atmosphere. Suitable pressures during hydrolysis are the same as those above, i.e., from atmospheric to 50,000 p.s.i.g. and preferably 100 to 10,000 p.s.i.g. The sodium dispersion is usually prepared in a hydrocarbon media which then can be added directly to the ether media without separation, e.g., the reaction media can be a combination ether and hydrocarbon media. Any of a wide variety of hydrocarbons can be employed in the preparation of the sodium dispersion and any suitable dispersion techniques can be employed, such as those described in the book, "Sodium: Its Manufacture, Properties and Uses," Marshall Sittig, Reinhold Publishing Corporation (1956).

Any of the metal chlorides are suitable for the process of this invention, including $CrCl_2$, $CrCl_3$, $MoCl_2$, $MoCl_3$, $MoCl_4$, $MoCl_6$, $WCl_2$, $WCl_4$, $WCl_5$, $WCl_6$. Preferably all of the above salts are employed in an anhydrous form since water appears to adversely effect the reaction forming the metal carbonyl intermediate.

The following examples illustrate the process of the present invention but are not intended in any way to limit the same. All quantities are given in parts by weight.

EXAMPLE I

A sodium dispersion was prepared in Nujol (a mixture of high boiling saturated aliphatic hydrocarbons) containing 40 weight percent sodium, the average particle size of the sodium being approximately 8 microns, the particles ranging in size from 2 to 10 microns. A quantity of this dispersion (1.2 grams of sodium) was added under an inert atmosphere to an autoclave. Diethylene glycol dimethyl ether (520 parts) was then added at room temperature to this dispersion and the autoclave was cooled to −20° C. 31.6 parts of anhydrous chromic chloride (0.2 mole) was then added to the reactor and the system was pressurized with 800 p.s.i.g. carbon monoxide pressure. This mixture was then stirred and the temperature maintained between −10 to −5° C. for 20 hours. The reaction appeared to be essentially complete after about 2–3 hours. To this reaction mixture was then added a solution containing 25 parts of sulfuric acid and 175 parts of water (oxygen free). While maintaining the carbon monoxide pressure at about 800 p.s.i.g. the reaction mixture was stirred for an additional two hours at a temperature ranging from 0–25° C. The product was thereafter steam distilled and the chromium hexacarbonyl recovered in 80 percent conversion.

EXAMPLE II

Example I was repeated except that 0.2 mole of molybdenum pentachloride was employed instead of the chromium chloride and 555 parts of the ether solvent was employed. The carbon monoxide pressure was also somewhat higher, i.e. 900 p.s.i.g. The initial reaction time was 4 hours, although it appeared that the reaction was completed in only a fraction of this period. The conversion to the molybdenum hexacarbonyl was 65 percent. When somewhat higher concentrations of the sodium are employed with the molybdenum pentachloride, i.e., using stoichiometric quantities based upon the reaction given above, yields of the order of 80 percent or better are readily obtained.

EXAMPLE III

Example I was repeated except that 0.1 mole of tungsten hexachloride was employed instead of the chromium chloride. Also 1.4 gram atoms of sodium were used with an initial carbon monoxide pressure of 900 p.s.i.g The reaction was continued for 4 hours and then hydrolyzed in the presence of carbon monoxide. The hydrolysis was carried out for an additional 3-hour period. The conversion to the tungsten hexacarbonyl exceeded 75 percent.

The following examples illustrate the use of different metal chlorides reacting with varying quantities of sodium in a variety of ether solvents. The procedure used in carrying out these examples is similar to that of Example I. However, in each of the following cases the sodium dispersion is prepared in the same solvent medium as employed in the reaction. Likewise, in these examples dilute hydrochloric acids are employed as the hydrolyzing media. In each case, a good yield of the metal hexacarbonyl is produced.

Table

| Ex. No. | Metal Chloride | Na., g. atom/ mole MCl$_x$ | Solvent | Temperature | |
|---|---|---|---|---|---|
| | | | | Reaction | Hydrolysis |
| IV | CrCl$_2$ | 4.0 | Diethylene glycol Dibutyl ether | −15 −35 | −10 −35 |
| V | MoCl$_2$ | 4.3 | Tetrahydrofuran | −10 | 10 |
| VI | MoCl$_4$ | 6.0 | Diethyl ether | −5 | 0 |
| VII | WCl$_2$ | 4.1 | Anisole | −15 | −10 |
| VIII | WCl$_4$ | 6.2 | Ethylene glycol Dimethyl ether | −25 | 20 |

The temperature at which the reaction is conducted is critical in order to obtain high yields of the desired metal carbonyl. Thus, the initial reaction should be carried out below about 0° C. and for economic reasons, it is best conducted at temperatures of from −50° to 0° C. A more preferred temperature range is from −30° to −10° C. At temperatures even slightly above 0° C. the yield of the desired metal carbonyl is appreciably diminished. The temperature of the hydrolysis and subsequent carbonylation is not as critical as the first reaction but is best conducted at 0° C. and below. Temperatures up to about 25° C. can be employed with a minor reduction in product conversion. In general, temperatures can be employed from about −50 to 30° C.

The time of reaction depends on other conditions under which the reaction is conducted, especially temperature, although times between one minute to about 20 hours are generally quite adequate. It is usually preferred to conduct the reaction for a period of from 30 minutes to 4 hours.

The quantity of sodium employed depends upon the metal salt employed. It is best used in stoichiometric quantities, although the desired product is formed in somewhat reduced conversions when used in quantities as low as 0.5 and as high as 2 times stoichiometric. The stoichiometry is based upon the equation given above in which the chloride ions are converted to sodium chloride and 2 atoms of sodium form an intermediate with the metal carbonyl.

The ethers which can be employed in the process of this invention can either be aliphatic or aromatic. The polyethers are preferred and give highest conversions. Typical examples of suitable ethers are diethyl ether, diisopropyl ether, dibutyl ether, methyl phenyl ether (anisole), ethyl phenyl ether, p-tolyl ether, ethylene glycol dimethyl ether, ethylene glycol dibutyl ether, diethylene glycol diethyl ether, diethylene glycol methylethyl ether, diethylene glycol dibutyl ether, triethylene glycol dimethyl ether and other alkyl ethers containing from 1 to 10 carbon atoms per alkyl group. The diethylene glycol dialkyl ethers having three oxygen atoms appear to coordinate with the metal compound and give best results. For this reason, these ethers are preferred in the process of this invention. Also, cyclic ethers, such as tetrahydrofuran and dioxane, can be used.

The process provides products which are of considerable use. These products can be, for example, subjected to high temperatures, thereby providing decomposition to obtain the respective metals in finely divided form. For example, when molybdenum carbonyl is heated at a temperature above 250° C. in an inert atmosphere, a finely divided pyrophoric product is obtained, which is useful in electronic tubes for anodes and support members or in alloying in making steels. The carbonyl of the metals chromium, molybdenum and tungsten and mixtures thereof or with other metal carbonyls, in various atmospheres, can be decomposed on metal surfaces, such as steel, to give resistant coatings, e.g., stable at high temperatures. These valuable metals can also be produced in extremely pure form and are sufficiently ductile for structural purposes as in aircraft fabrication. Another particular use for the compounds produced according to the process of this invention is as additives to fuels, particularly those used for internal combustion engines and the like. For example, when sufficient chromium hexacarbonyl is added to commercial gasoline to obtain compositions containing 1 gram of chromium per gallon, the octane number of the gasoline is increased. The products are also useful as chemical intermediates in preparing organometallic compounds. These and other uses will be evident to those skilled in the art.

Having thus described the process of this invention, it is not intended that it be limited except as set forth in the following claims.

I claim:

1. A process for the manufacture of carbonyls of metals of group VI–B of the periodic table comprising simultaneously reacting in an inert solvent a chloride of a metal of group VI–B of the periodic table with carbon monoxide and sodium metal at a temperature between about −50° and about 0° C., and thereafter hydrolyzing the intermediate product in an atmosphere of carbon monoxide, the carbon monoxide being employed in both steps at a pressure of from atmospheric to 50,000 p.s.i.g.

2. The process of claim 1 wherein the reaction is carried out using a carbon monoxide pressure in both steps of from about 100 to 10,000 p.s.i.g.

3. The process of claim 1 wherein the inert solvent is a diethylene glycol dialkyl ether in which the alkyl groups each contain 1 to about 10 carbon atoms.

References Cited in the file of this patent

UNITED STATES PATENTS

| 1,894,239 | Naumann et al. | Jan. 10, 1933 |
| 2,803,525 | Brimm et al. | Aug. 20, 1957 |

OTHER REFERENCES

Mond: "The Metal Carbonyls," Journal of the Society of Chemical Industry, vol. 49, No. 24, June 13, 1930, page 277T.

UNITED STATES PATENT OFFICE
CERTIFICATE OF CORRECTION

Patent No. 2,952,524　　　　　　　　　　　　September 13, 1960

Harold E. Podall

It is hereby certified that error appears in the above numbered patent requiring correction and that the said Letters Patent should read as corrected below.

Column 2, line 9, for

"(2) $Na_2M(CO)_5 + 2H_3O^+ \longrightarrow M(CO)_5 + 2Na^+ + H_2 + H_2O$"

read

-- (2) $Na_2M(CO)_5 + 2H_3O^+ + CO \longrightarrow M(CO)_6 + 2Na^+ + H_2 + 2H_2O$ --.

Signed and sealed this 11th day of February 1964.

(SEAL)
Attest:

ERNEST W. SWIDER
Attesting Officer

EDWIN L. REYNOLDS
Acting Commissioner of Patents